July 6, 1965 A. E. SOCIN 3,192,653
BLADE WITH A PLURALITY OF WEDGE SHAPED TEETH
ANGULARLY DISPOSED TO SAID BLADE
Filed March 29, 1957 5 Sheets-Sheet 1
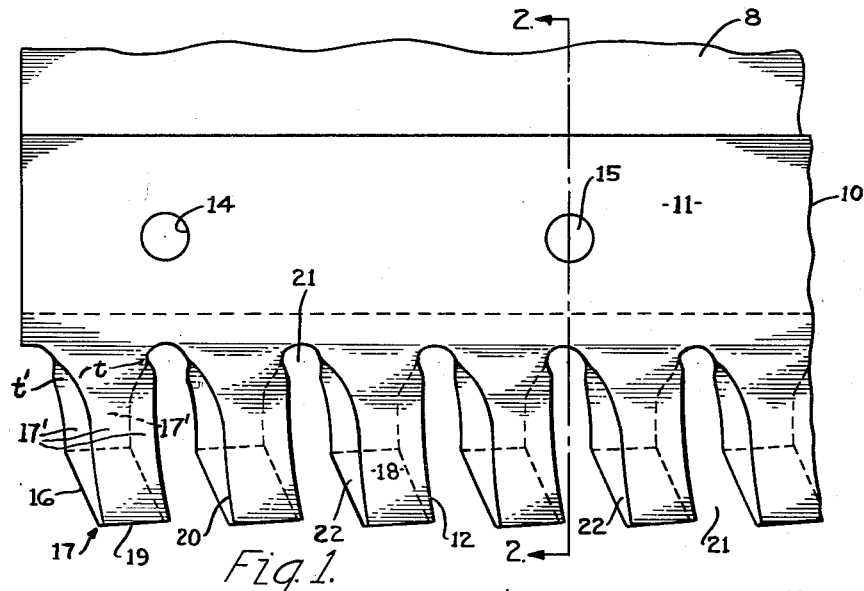
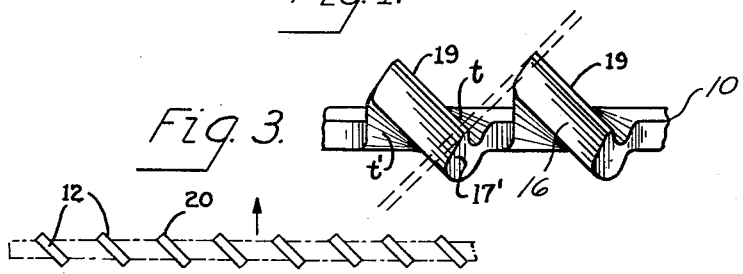
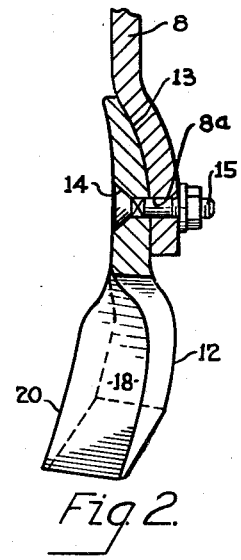
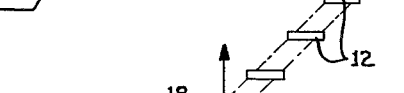
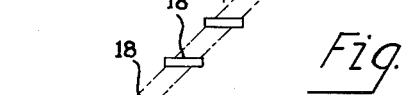
INVENTOR.
Arthur E. Socin
BY Stough & Stough
ATTORNEYS.

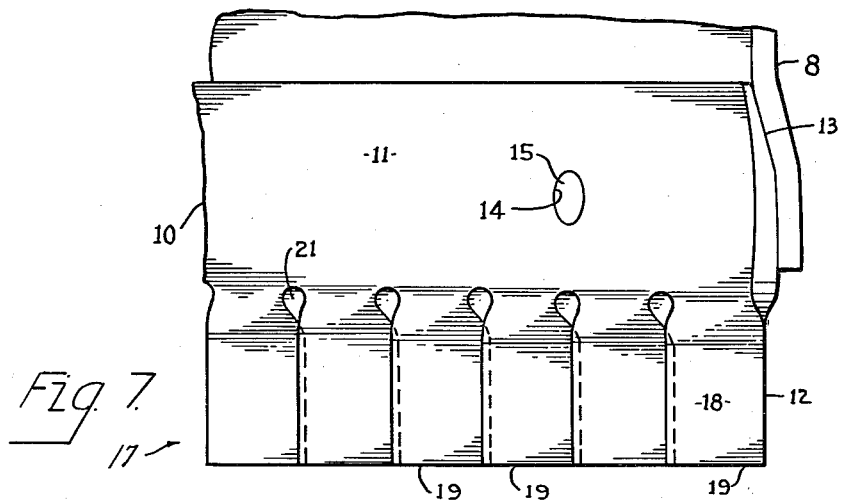
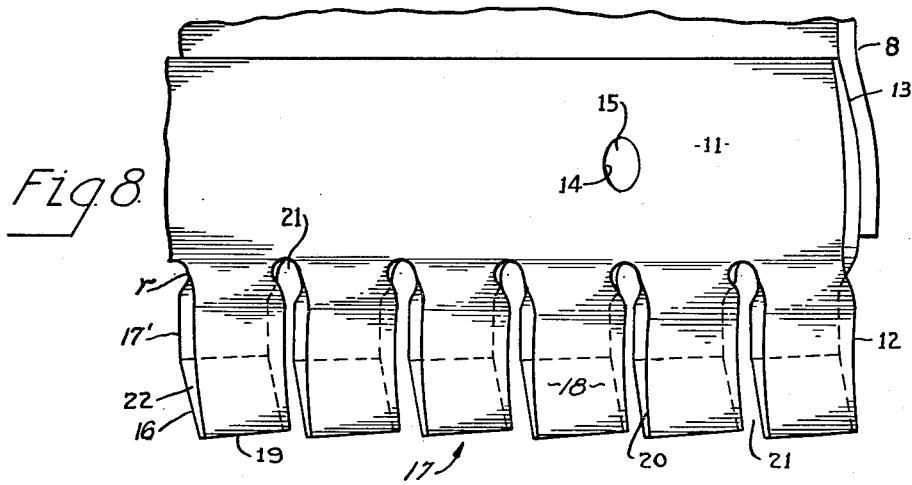
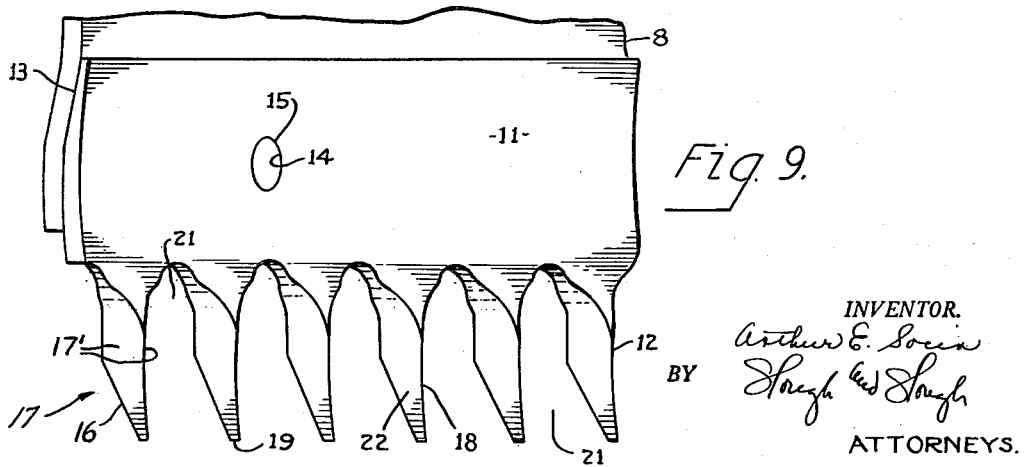

United States Patent Office 3,192,653
Patented July 6, 1965

3,192,653
BLADE WITH A PLURALITY OF WEDGE SHAPED TEETH ANGULARLY DISPOSED TO SAID BLADE
Arthur E. Socin, Bucyrus, Ohio, assignor to Shunk Manufacturing Company, Bucyrus, Ohio
Filed Mar. 29, 1957, Ser. No. 649,353
4 Claims. (Cl. 37—141)

My invention relates to blades and material penetrating and material working devices and relates more particularly to blades which are adapted to be associated with heavy earth and material moving and road working equipment, such as road graders, maintainers, bulldozers, angle dozers, shovels, scrapers, buckets, ditchers, trenchers, scoops etc. and other machines used for movement or preparation of earth or other materials.

In a road working unit, blades are commonly attached to pivoted moldboards of the road working unit whereby the angle of said blade can be varied relative to the forward direction of the machine. Such equipment is particularly adapted for purposes of grading, leveling, digging, removal of ice from highways, etc. and detachable blades of different types are ordinarily employed to meet different conditions. The blade of my invention as herein described and illustrated is designed to be used under a variety of conditions obviating the frequent changing of blades and eliminating the loss of time resulting therefrom.

It is, therefore, an object of my invention to provide a blade of above mentioned type which embodies utility for a variety of road and material working or earth moving operations, such as scraping, digging and scarifying.

Another object of my invention is to provide a blade of the above type which more easily penetrates all types of earth, material, and road material.

Still another object of my invention is to provide such a blade which will require less power to operate thereby resulting in a saving on fuel and equipment.

Yet another object of my invention is to provide such a blade which is adapted to be used with existing types of heavy earth and material moving and road working equipment.

Still another object of my invention is to provide a blade of the type referred to which will penetrate, break up, pulverize and dig in hard materials in a more efficient manner.

A further object of my invention is to provide a blade as described above which is simple and economical to manufacture and capable of withstanding hard usage.

Another object of my invention is to provide a blade as referred to herein which will expeditiously handle in a minimum of time a maximum load.

FIG. 1 is a fragmentary front plane view of a first embodiment showing the improved blade of my invention, the same being shown attached to a moldboard;

FIG. 2 is a view taken along the line 2—2 of FIG. 1;

FIG. 3 is a bottom plan view of a portion of the blade as shown in FIG. 1, the dotted lines showing the degree of overlap in one operative position;

FIGS. 4, 5 and 6 are diagrammatic views of a portion of the blade of my invention shown in FIG. 1;

FIG. 7 is a view showing the blade of FIG. 1 disposed at a 45° angle to the direction of travel;

FIG. 8 is a view showing the blade of FIG. 1 disposed at a 30° angle to the direction of travel;

FIG. 9 is a view showing the blade of FIG. 1 disposed at a 45° angle to the direction of travel, said angle being in an opposite direction to that of FIG. 7;

Figure 10:
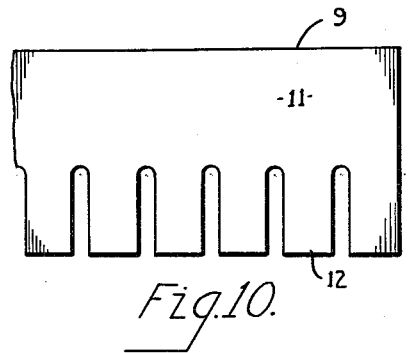
FIG. 10 is a plan view of the blank from which the blade of FIGS. 1 to 9 inclusive is formed.
Figure 11:
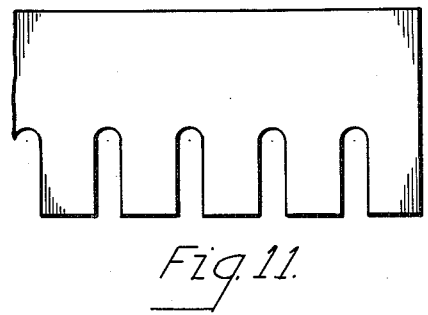
FIGS. 11 and 12 are plan views of blanks from which blades similar to that shown in the form of FIGS. 1 to 9 inclusive may be formed.
Figure 12:
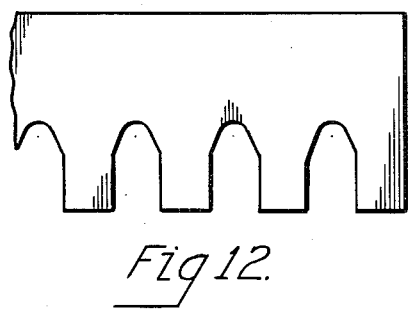
Figure 13:
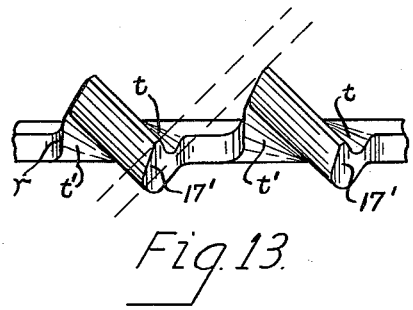
FIG. 13 is a bottom view similar to that of FIG. 3 showing a blade formed from the blank of FIG. 11.

Referring now more particularly to the drawings, in all of which like parts are designated by like reference characters, and first referring to the form of my invention shown in FIGS. 1 to 10 inclusive, in FIG. 10, I show a portion of the blank 9 from which the preferred blade 10 of my invention is formed. Said blank 9 is manufactured from heavy relatively thick metal or steel by forming, forging, casting, etc. The blank 9 is provided with a rectangular body portion 11, a plurality of similarly formed teeth 12, said teeth being preferably in the form shown, evenly spaced.

As best illustrated in FIGS. 1, 2, 7, 8 and 9, the body portion 11 of the finished blade 10 is preferably provided with a longitudinally disposed bevel 13 at its uppermost portion and has a plurality of spaced openings 14 centrally disposed in the vertically medial portion of the body portion 11 through which bolts 15 are adapted to be disposed, said openings 14 being aligned with openings 8a (FIG. 2) in the moldboard 8 to which said blade is secured by the bolts 15. The teeth 12, which in the blank 9 of FIG. 10, are shown as being relatively thick and in the plane of the body portion 11, are as illustrated herein, provided with beveled undersurfaces 16 adjacent the biting portion 17 of the said teeth and constitute, as shown, substantially "wedge-shaped" portions 17'. In the manufacturing process, the blade of this first embodiment of my invention is preferably formed with the teeth 12 of the blank 9 disposed in the plane of the body portion of the blade and the teeth 12 in the finished blade of my invention are disposed at an angle to the body 11 of the blade proper. This is accomplished by rotating each of the teeth 12 about their substantially thick root portions "$r$" lying adjacent said blade body portion 11 integral therewith, forming thereby generally triangular trough portions "$t$," "$t$" on the opposite faces of the root portion "$r$," thereby disposing one lateral edge of the forward face 18 of each tooth generally forwardly of the blade 11, the forward face 18 of the body portion of the tooth being flat, the lateral faces 20, 22 of the wedge shaped portions 17' of the tooth portion being substantially flat; the said rotation of the teeth being substantially a rotation about an axis disposed longitudinally and centrally of each of the said teeth. It will be obvious to those skilled in the art to which my invention appertains that said teeth might be initially cast or otherwise disposed in such plane to the blade.

The blade 10 as thus constituted with the wedge shaped portions 17' of said teeth disposed at generally oblique angles or in another plane to the body portion has very important distinctions over work handling, earth moving, and road working blades of the prior art with which I am familiar. To illustrate such distinctions and to achieve an understanding of the operative uses to which the blade may thus additionally be adapted, I have shown in FIGS. 4, 5 and 6 certain diagrammatic views of the blade, showing the same rotated or fixed in various optionally seated positions or degrees of inclination to the direction of travel of the machine relative to the work surface, and have, in various other views, notably FIGS. 1, 7, 8 and 9, shown the surfaces first presented to the working material for various types of operation. FIG. 7 shows the position of the blade diagrammatically presented in the view of FIG. 5. In this view the blade operates with a scraping action and since the teeth are disposed perpendicularly to the direction of travel of the blade, they are so to speak "overlapped" whereby the front surfaces 18 of the teeth present a substantially laterally continuous scraping surface to the material and the lower flat edges 19 of the biting portions 17 of said teeth form a laterally continuous scraping surface.

FIG. 1 shows the position of the blade, diagrammatically illustrated in FIG. 4, and in this position, the blade is disposed perpendicularly to the direction of travel of the machine and the teeth are disposed at a 45° angle to the direction of travel of the blade. In this position the leading edges 20 of the teeth 12 first enter the work material and the material is guided by the front surfaces 18 and trough positions "$t$" through the openings 21 disposed between adjacent teeth, the said blade thus operating with a shearing, shaving action upon the work material.

FIG. 9 shows the position of the blade, diagrammatically illustrated in FIG. 6, wherein the front surfaces 18 of the teeth 12 are disposed at a 90° angle to such direction of travel. In such position the wedge-shaped surfaces 17' of the teeth first enter the work material and scarify to tear up the material through which the blade passes.

FIG. 8 is a view similar to that of FIGS. 7 and 9 and shows the blade in a position intermediate that of FIGS. 1 and 7 and intermediate that diagrammatically illustrated in FIGS. 4 and 5, and in this intermediate position the leading edges 20 of the teeth first enter the work material and the biting portions 17 and the front surfaces 18 still substantially operate upon the material to contribute a compound scraping and shearing action. In other words, a partial scraping action of FIG. 7 and a partial shearing action of FIG. 1 are combined in the blade in this operative position. The blade in this position will not totally achieve the scraping of FIG. 7 or the shearing of FIG. 1. It will be noted that the scraping surface in this form is a laterally interrupted surface, the openings 21 effecting the slight interruptions. The teeth, being disposed in a plane at angles to the plane of the blade proper, overlap to a certain extent and thus the openings are reduced as far as the spacing therebetween is concerned.

It will be clear from the foregoing description and illustrations that a wide choice by the operator of various other operating positions could produce a wide variety of mixed or singular scarifying, scraping, shearing, etc. operations to successfully handle different conditions.

It will further be obvious that the teeth can be disposed at any angle or in any plane intersecting the plane of the blade proper as preferred and formed by any preferred process and that, while I have shown the blade of my invention adapted for use as a right hand blade, opposite forming of teeth and blade could be used to adapt the same for use as a left hand blade. It will further be obvious that, while I have shown the blade of my invention as secured to a moldboard, the same could be attached to a shovel, trencher, etc. or any other machine or tool of the type having a blade secured thereto with beneficial results.

The openings 21 between adjacent teeth, which as best shown in FIGS. 1, 7, 8 and 9 are virtually extinguished in the positioning of FIG. 7, only slightly channel the work material in FIG. 8, are widest in FIG. 9 and slightly less in FIG. 1. Thus, when the blade is placed in the position of FIG. 7, the scraping action is such that any "corduroy" effect on a road is virtually eliminated; in the combined shearing and scraping action of FIG. 8, a minimum "corduroy" effect would be produced and this would be counteracted by the combined scraping and shearing action reducing the size of the work particles passing therethrough, and, in the shearing action of FIG. 1 and scarifying action of FIG. 9, the openings are presented more openly to secure improved shearing and scarifying action.

As shown in FIGS. 10, 11, 12, 13 and 23, it will be obvious that the size of the openings, the width of the teeth and alternate variations thereof, may be made, as well as an infinite variety of positioning, as shown hereinbefore in FIGS. 4, 5 and 6.

Figure 20:
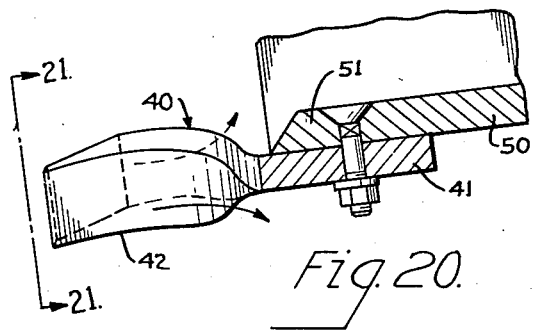
FIG. 20 is a sectional view of a blade similar to that illustrated in FIGS. 14 to 19 inclusive showing the blade attached to a portion of a shovel or bucket.
Figure 19:
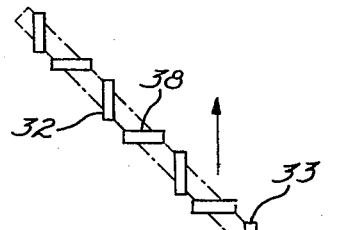
FIG. 19 is a diagrammatic view of the blade of FIGS. 14 to 18 inclusive, shown at a 45° angle relative to the direction of travel of the blade.
Figure 21:
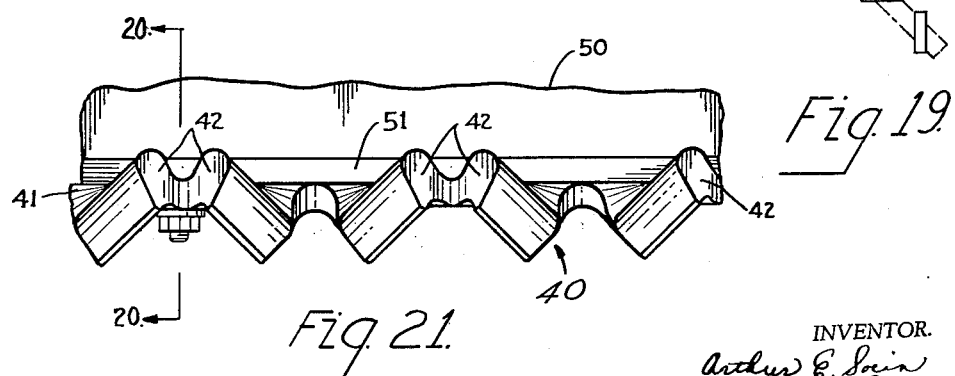
FIG. 21 is a view taken on the line 21—21 of FIG. 20.

In FIGS. 14 to 19 inclusive, I have shown another embodiment of my invention and in this embodiment I have disposed the teeth 32, which similarly to the teeth 12 of the other embodiments herein illustrated are disposed in a plane which intersects the plane of the body 31 of the blade 30, in alternately angled relation to each other and to the body portion. The blade 30 is shown secured to a moldboard 28 in FIGS. 14, 16, 17 and 18. In this form of my invention and in the form of FIGS. 1 to 13 inclusive, when the blade is secured to a moldboard, the body of the blade is always substantially perpendicularly disposed to the surface of the material. In the form of FIGS. 20 and 21, where the blade 40 is secured to the bottom and forwardly presented edge 51 of a bucket 50, the blade and teeth are disposed substantially at an angle to the perpendicular, or in other words, are disposed in parallel plane to the plane of the leading edge of the bottom of the bucket.

Figure 14:
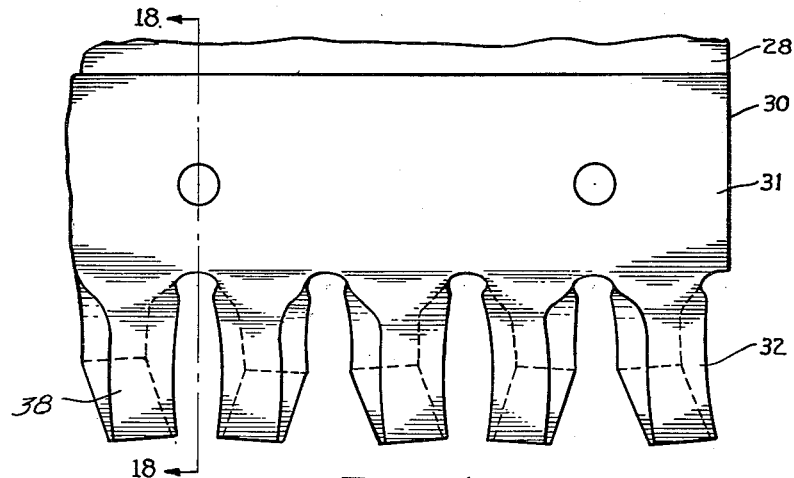
FIG. 14 is a fragmentary front view of another embodiment of my invention, the said view being similar to that of FIG. 1.
Figure 15:
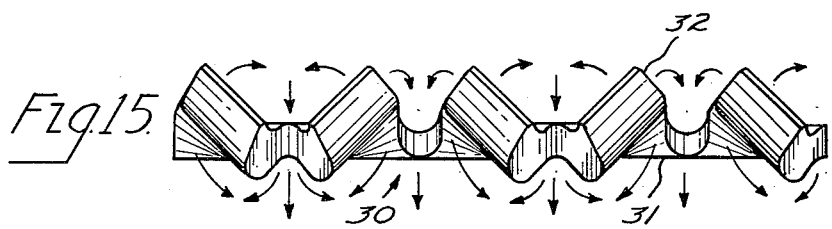
FIG. 15 is a bottom plan view of the portions of the blade shown in FIG. 14, the arrows showing the direction of movement of the material being displaced by the blade.
Figure 16:
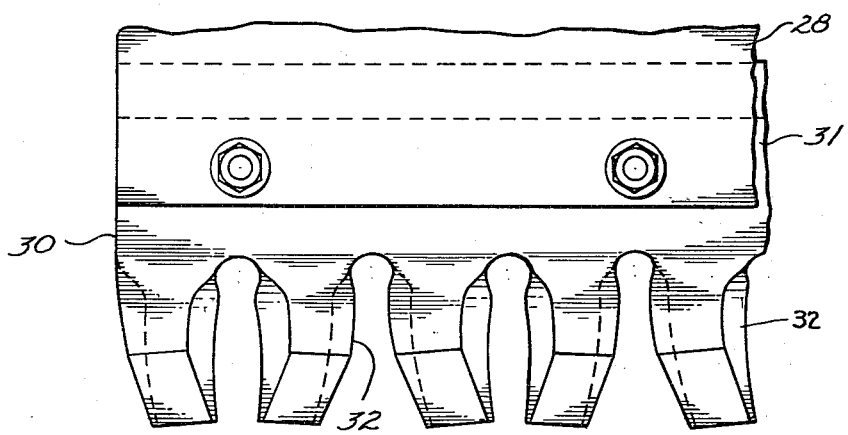
FIG. 16 is a rear view of the portion of the blade illustrated in FIGS. 14 and 15.

By angling alternate teeth at an angle to each other, in the form of my invention shown in FIGS. 14 to 21 inclusive, as well as to the plane of the blade proper, I have achieved a combination of movements, which produce, in the form illustrated in FIGS. 14 to 19, when the blade is disposed at right angles to the direction of travel of the blade and particularly as illustrated in FIGS. 14 and 16, not only partial scarifying, shearing and scraping actions of the blade of the first embodiment but also achieves a compound "churning" or "boiling" movement which is illustratively shown in FIG. 15 by arrows.

Figure 17:
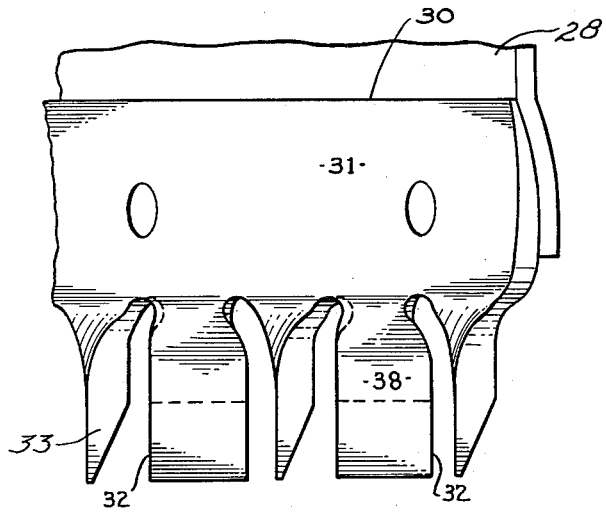
FIG. 17 is a view showing the blade of FIGS. 14 to 16 inclusive disposed at a 45° angle to the direction of travel of the blade.
Figure 18:
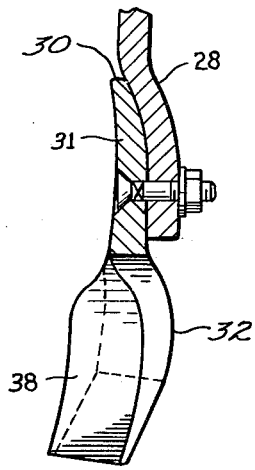
FIG. 18 is a view taken along the line 18—18 of FIG. 14.

When the blade is rotated or fixed in the position of FIG. 17, the teeth 32 present scraping surfaces 38 and wedge-shaped surfaces 33 which act as scarifiers, and the scraping and scarifying movements produce a pulverization of the material passing generally laterally of the blade.

In the form of FIGS. 20 and 21 it will be noted that the action of the blade 40 is one of continuous penetration of the material, and the direction of movement of said blade is substantially parallel with the longitudinal direction of the teeth 42. As is well shown in FIG. 20, the body portion 41 of the blade 40 and the forward edge 51 of the bucket 50 present a vertical thickness of substantial dimension which must penetrate the material which is to be moved; it will be noted, however, that the twisted or skewed teeth 42, because of their angled relationship to the body portion 41, present a vertical dimension in excess of the dimension of said body portion and said forward edge combined. It will be understood, therefore, that the forwardly advancing teeth 42, which penetrate the work material first, effectively break and separate said work material in a vertical dimension sufficient to allow easy penetration of the combined bucket 50 and the body portion 41 which follow.

The breaking and separating action of the teeth 42 of the blade 40, as above described, provides several favorable results. In addition to easier penetration by the bucket 50, the work material is broken into small fragments, which results in fewer voids in the loaded bucket, the consequence of which is that a greater load can be carried in each handling operation. The bucket can be loaded to capacity in a shorter distance of travel due to the easier and therefore deeper penetration. A further saving is made in time as each loading is accomplished more quickly.

It will be noted that whereas the blade 10 of FIGS. 1 to 13 inclusive is either right-handed or left-handed, the blade 30, because of the alternately angled teeth 32, is usable at any desired angle. Either of the blades 10 and 30, when attached to a moldboard as shown in FIGS. 1 and 14, can be used at a less acute angle relative to the direction of travel because of the substantially reduced resistance of the blades of my invention over other blades with which I am familiar. This results in an increased lateral dimension of work surface covered in each handling operation.

Additionally, when the blades of my invention are used in grading operations, the versatility of said blades makes them adaptable for all types of road grading operations, and the present practice of changing blades to meet different operating conditions is eliminated. The improved characteristics of my blades result in an increased breaking of the material which is superior to that which would be accomplished by a combination of specialized blades now in use.

Figure 23:
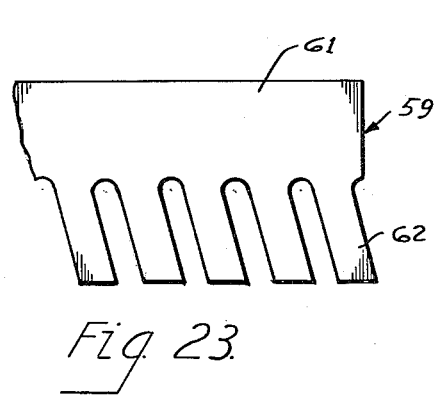
FIG. 23 is a fragmentary plan view of the blank from which the blade of FIG. 21 is formed.
Figure 22:
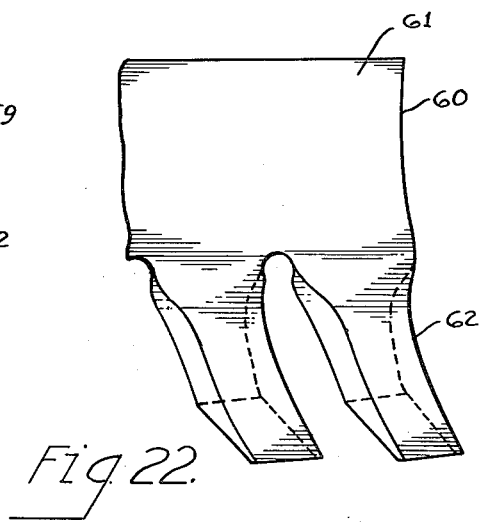
FIG. 22 is a fragmentary front view of still another embodiment of my invention.

In FIG. 22, I show a still further modified blade 60 comprising an upper body portion 61 and a plurality of preferably evenly interspaced teeth 62. The blade 60 is formed of a blank 59 as shown in FIG. 23 and it will be noted that in said blank, the teeth 62 extend downwardly and laterally obliquely relative to the plane of the body portion 61 of said blank. In the forming operation, the teeth 62 are twisted or skewed in a manner similar to the teeth 12 of the blade 10. The blade 60 would be either right or left handed depending upon the direction of the obliquely slanted teeth 62 and the angle at which said teeth are positioned. The teeth may further be initially formed in the blade of this embodiment at an angle or in a plane intersecting the plane of the said body portion.

It will be understood that the forms of my invention as shown and illustrated herein do not exhaust all of the possible variations of tooth arrangements. For example, the teeth of the blade could be formed at any angle and could be of various angles on the same blade. Also, the teeth could vary in size and be shaped to meet specific material-handling problems if so desired. Blades having oppositely angled teeth, as illustrated in FIGS. 14, 15 and 16 could be formed whereby the teeth on either side of the lateral center of the blade were uniformly angled in the same direction, said direction being opposed to that of the opposing half of said blade. It will also be obvious that any combination of angled teeth disposed at any angle in complementary or opposite directions could be formed, that said teeth could be straight, laterally slanted, or forwardly or rearwardly curved, and that said teeth could be combined with a blade having straight, laterally continuous portions as in a conventional blade.

It will further be understood that the present invention may be adapted for use with various material penetrating and material working devices where a support for the teeth may be substituted for the blade body portion as shown in the forms illustrated and the teeth may be used as cleats, work penetrating or material handling devices with a similar effectiveness.

Many variations and departures from the details of my invention as it is herein described and illustrated may be made, therefore, without departing from the spirit of my invention or the scope of the appended claims.

What I claim is:

1. A blade of the type for attaching to the adjustable moldboard of a road grader, said blade designed to operate in a substantially perpendicular position and having a downwardly directed work edge contacting a work surface, said blade having its longitudinally greatest dimension in the direction of said work edge, said blade designed to be operatively angularly disposed relative to the direction of travel of said blade, said work edge having downwardly directed interspaced teeth, said blade having a body portion for attachment to said moldboard, said teeth being thick and provided with a substantial wedge-shaped portion having lateral flat faces, a flat scraping edge and a flat forwardly disposed face, said flat face being disposed in a plane intersecting the plane of said body portion, and said teeth overlapping in the direction of the plane of the blade.

2. A blade of the type for attaching to the adjustable moldboard of a road grader, said blade designed to operate in a substantially perpendicular position and having a downwardly directed work edge contacting a work surface, said blade having its longitudinally greatest dimension in the direction of said work edge, said blade designed to be operatively angularly disposed relative to the direction of travel of said blade, said work edge having downwardly directed teeth, said blade having a body portion for attachment to said moldboard, each of said teeth being thick, each provided with a wedge-shaped portion having lateral flat faces, a flat scraping edge and a flat forwardly disposed face, said forwardly disposed flat face being disposed in a plane obliquely intersecting the plane of said body portion, said teeth being uniformly interspaced in the direction of the plane of said body portion, said teeth being all of the same uniform width throughout a major portion of the length thereof, and said flat faces being in parallel planes.

3. A work handling tool of the type referred to comprising a substantially thick, blade-like body portion having a plurality of integrally formed, wedge-shaped teeth along one edge thereof, said teeth being substantially thick and having a flat forward face, a twisted root portion having a triangular configuraion when viewed in elevation, said root portion of the tooth being disposed adjacent the blade-like body portion, and having a lateral face thereof facing obliquely and forwardly relative to said body portion, each of said teeth having straight flat scraping edges at the distal end thereof which lie in a single plane.

4. A work handling tool as claimed in claim 3 having said twisted root portion on the forward face of the tooth and a similar twisted root portion on the rear face of said tooth, said twisted portions forming with flat forward faces of the wedge-shaped teeth and the flat scraping edges, work surfaces.

References Cited by the Examiner

UNITED STATES PATENTS

| | | | |
|---|---|---|---|
| 369,686 | 9/87 | Brown | 37—145 |
| 814,446 | 3/06 | Herter | 37—145 |
| 918,993 | 4/09 | Gaines | 37—145 |
| 1,031,688 | 7/12 | Chase | 172—380 |
| 1,661,954 | 3/28 | Michaelis | 56—400.05 |
| 1,999,226 | 4/35 | Wold | 37—35 |
| 2,042,405 | 5/36 | Knudson | 37—179 |
| 2,105,320 | 1/38 | Heil | 37—38 |
| 2,164,988 | 7/39 | De Biasi | 37—141 |
| 2,221,906 | 11/40 | Birk | 37—145 |

FOREIGN PATENTS 83,018  4/35  Sweden.

BENJAMIN HERSH, *Primary Examiner.*

ABRAHAM J. GOLDBERG, FRANK B. SHERRY, THEODORE G. GRAVER, RICHARD DOUGLAS, GEORGE HYMAN, Jr., CHARLES E. O'CONNELL, *Examiners.*